Oct. 3, 1933.                T. P. McDERMOTT                1,928,628
                              SOIL PIPE FITTING
                            Filed Jan. 24, 1931

INVENTOR
Thomas P. McDermott
BY
Gardner D. Pesson
ATTORNEY

Patented Oct. 3, 1933

1,928,628

UNITED STATES PATENT OFFICE 1,928,628

SOIL PIPE FITTING

Thomas P. McDermott, Boston, Mass.

Application January 24, 1931. Serial No. 511,019

3 Claims. (Cl. 4—212)

This invention relates to fittings for pipes used in plumbing particularly for soil pipes.

As is well known, these pipes are generally of cast metal, of considerable diameter and rather clumsy.

The health regulations of many cities require that they shall be kept clear and that any tendency to clog up shall be avoided. Besides this, such regulations usually require some sort of a vent to let out the foul air and also to prevent water pockets from being formed.

This invention is the combination of a soil pipe with a certain fitting and other pipes and also the fitting itself considered as a unit.

In many locations these fittings which lead from toilets and other similar plumbing fixtures must be located between floors where space is limited or overhead where they must be above the heads of passersby.

With many types of connections now in use a great amount of vertical space, which is therefore waste, is necessary in order to accommodate such fittings and fixtures.

This results in the loss of perhaps six inches or a foot between the stories of skyscrapers, the aggregate amounting to a very substantial waste of space.

The advantages of my particular fitting are that it can be used either with a horizontal or a vertical soil pipe as the inlet and the vent will conform themselves to either type and will still be of such character that there is little danger of clogging up.

Other advantages are that on account of the acute angular relation to the various pipes the tendency is to relieve any positive pressure which might force foul gas through the water seals and relieve negative pressure which might siphon the traps.

Such troubles occur at times when there is an especially heavy discharge.

In the drawing, Fig. 1 is a perspective view of a battery or series of my fittings with appropriate connections located close to the ceiling of a room.

Figure 1:
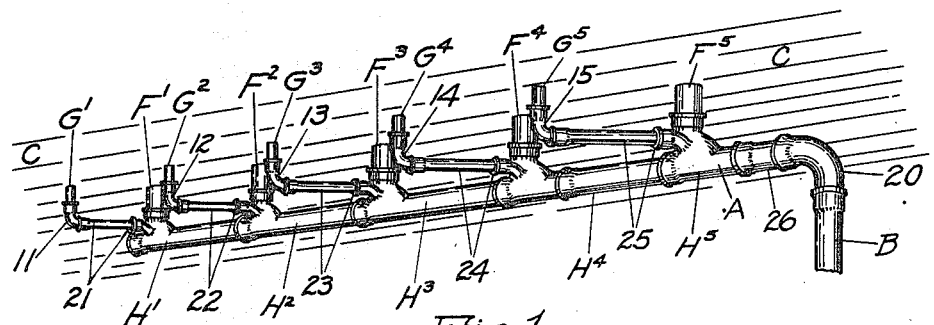

In the drawing, A represents a horizontal soil pipe which enters an elbow at 20 and from thence at B goes down through a vertical outlet soil pipe.

C is a ceiling down through which extends the inlet soil pipes $F^1$, $F^2$, $F^3$, $F^4$, $F^5$ and the inlet vent pipes $G^1$, $G^2$, $G^3$, $G^4$, $G^5$. These vent pipes connect with suitable elbows 11, 12, 13, 14, 15 and each enters a vent pipe branch, to be described, through connecting vent pipes 21, 22, 23, 24, 25.

The horizontal soil pipe shown, actually is made up of the fittings $H^1$, $H^2$, $H^3$, $H^4$, $H^5$ all of my design together with a single section 26 which connects $H^5$ with elbow 20.

It is apparent, however, that the whole horizontal pipe might be made up of sections similar to $H^1$ or there might be more sections similar to 26 which are not my type of fitting.

Taking $H^1$ as typical, it comprises a main section 1 of substantially tubular form having at one end a hub 3 or connection and the other end 2 being of a size to fit into a hub similar to 3 of an adjoining section such as $H^2$.

Figure 5:
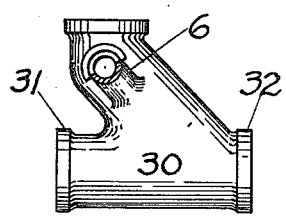
Fig. 5 is a view similar to Fig. 2 of a modification.

As shown in Fig. 5, however, I may use a shorter main section, such as 30, with hubs 31 and 32 one at each end.

4 is a substantially tubular inlet branch which enters main section 1 at an acute angle and is provided at its free end with a hub or coupling 5 which projects at a right angle with main section 1 so that it can engage an inlet soil pipe such as $F^1$ which extends at right angles to the main section 1 of my fitting.

6 is a substantially tubular vent pipe branch which enters the inlet branch 4 at an acute angle and terminates in a hub or coupling 7 which extends out perpendicularly to a plane which extends through the axes of the inlet branch and the main section.

A plane extending through the axes of the inlet branch and the vent pipe branch will cut the axis of the main section at an acute angle.

Figure 2:
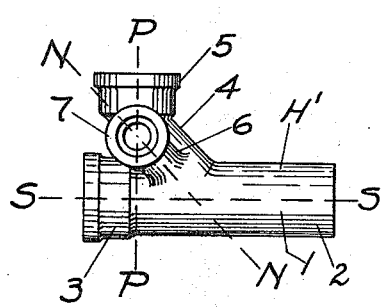
Fig. 2 is a view of one of my fittings looking into the hub or inlet of the vent.
Figure 3:
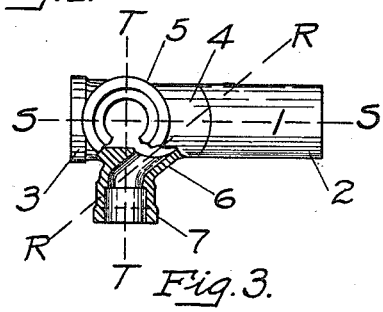
Fig. 3 is a view of one of my fittings looking into the hub of the inlet.

As shown in Figs. 1, 2 and 3, if the main soil pipe section which carries away the refuse from a number of closets is horizontal, as if it extends along close under the floor of the room above and close to the ceiling of the room below, the hubs of the inlet branches can extend up vertically giving through connection with the different soil pipes and the different closets and as there are two bends of forty-five degrees each instead of one bend of ninety degrees, there is less danger of the pipe stopping up.

Moreover, as the vent pipe branch extends out horizontally so as to clear the inlet branch and at the same time enters it at an angle of forty-five degrees, there is very little danger of refuse piling up and stopping the vent pipe.

Figure 4:
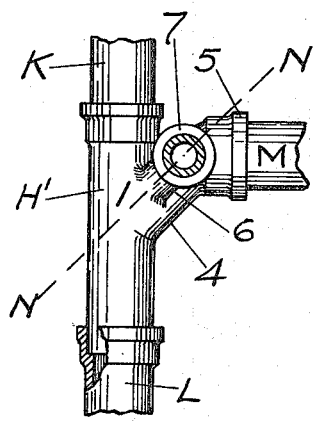
Fig. 4 is an elevation showing the main section of my fitting standing vertically and connecting through its inlet with a horizontal soil pipe.

If, however, as shown in Fig. 4, it is desirable that my fitting such as H¹ should be in a position with its main section vertical to connect with a soil pipe K above and another soil pipe section L below, the inlet branch 4 can connect with a horizontal soil pipe such as M and still enters the main section 1 at an angle whereby the danger of plugging up is avoided and the vent pipe branch 6 enters the inlet branch 4 at an angle so that in this case also the danger of clogging is avoided and the fitting is very compact and convenient.

In every case, while getting a very compact, integral single fitting, the normal flow comes in to the main section at an angle and sweeps past the mouth of the vent pipe branch which branch extends at an acute angle the result being that the tendency is to keep this vent pipe entirely clear instead of piling up at the mouth.

For a better understanding of the relation between the main section, the inlet branch and the vent pipe branch, I describe each and its direction in the claims meaning thereby the direction of the axis of each part.

S, S indicates the axis of the main section which coincides with the axis or direction of its hub.

N, N indicates the axis or direction of the inlet branch and P, P of its hub.

R, R indicates the axis or direction of the vent pipe branch and T, T the axis or direction of its hub.

Figure 6:
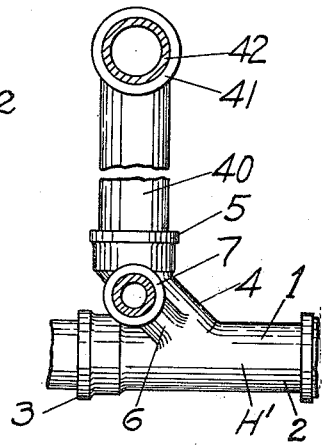
Fig. 6 is a plan view showing my main section running horizontally and connecting through the inlet with a horizontal soil pipe at right angles to the main section, this soil pipe connecting by an elbow with a vertical soil pipe.

In Fig. 1, I show my main sections horizontal and the inlet pipe hubs opening vertically while the vent pipe hubs open horizontally and in Fig. 4, I show my main section vertical, inlet hub pointing horizontally and vent hub pointing horizontally, but as shown in Fig. 6, I can use still another arrangement.

In Fig. 6, main section 1 is horizontal while the hub 5 of the inlet opens horizontally and receives one end of a soil pipe 40 the other end of which at 41 connects by a suitable elbow with a vertical soil pipe 42.

The hub or outlet 7 of the vent pipe points up vertically in this case.

It is apparent that my fitting can be turned at various other intermediate angles and in fact in various other directions which it is not necessary to mention.

I claim:

1. The combination with a soil pipe; of a fitting which has a straight main section in line with the adjoining parts of the soil pipe, said fitting having an inlet branch which enters the main section at an acute angle, said inlet branch having a vent pipe branch which enters it at an acute angle in a plane at an acute angle with the main section.

2. A soil pipe fitting which has a straight main section, said fitting having an inlet branch which enters the main section at an acute angle, said inlet branch having a vent pipe branch which enters it at an acute angle in a plane at an acute angle with the main section.

3. A soil pipe fitting which has a substantially tubular main section with a hub at one end, said fitting having a substantially tubular inlet branch which enters the main section at an acute angle, said inlet branch having a hub which projects at substantially a right angle to the axis of the main section, and a substantially tubular vent pipe branch which enters the inlet branch at an acute angle and has a hub which projects perpendicularly to a plane through the axes of the main section and of the inlet branch, the axes of the vent pipe branch and of the inlet branch both lying in a plane which cuts the axis of the main section at an acute angle.

THOMAS P. McDERMOTT.